(12) United States Patent
Serpelloni

(10) Patent No.: US 8,512,779 B2
(45) Date of Patent: Aug. 20, 2013

(54) PROCESS FOR COATING FOOD PRODUCTS

(75) Inventor: Michel Serpelloni, Beuvry les Bethune (FR)

(73) Assignee: Roquette Freres, Lestrem (FR)

( * ) Notice: Subject to any disclaimer, the term of this patent is extended or adjusted under 35 U.S.C. 154(b) by 1891 days.

(21) Appl. No.: 11/037,096

(22) Filed: Jan. 19, 2005

(65) Prior Publication Data

US 2005/0158429 A1    Jul. 21, 2005

(30) Foreign Application Priority Data

Jan. 20, 2004   (FR) ..................... 04 00503

(51) Int. Cl.
*A23L 1/00* (2006.01)

(52) U.S. Cl.
USPC ........................................ 426/102

(58) Field of Classification Search
USPC ................. 426/94, 293, 302, 303, 305, 439, 426/549, 243, 292, 102
See application file for complete search history.

(56) References Cited

U.S. PATENT DOCUMENTS

| | | | |
|---|---|---|---|
| 3,597,227 A | | 8/1971 | Murray et al. |
| 4,504,509 A | | 3/1985 | Bell et al. |
| 5,009,903 A | * | 4/1991 | deFigueiredo et al. ....... 426/243 |
| 5,059,435 A | | 10/1991 | Sloan et al. |
| 5,648,110 A | | 7/1997 | Wu et al. |
| 5,997,918 A | | 12/1999 | Melvej |
| 2003/0198711 A1 | | 10/2003 | Pickford |

FOREIGN PATENT DOCUMENTS

| | | | |
|---|---|---|---|
| EP | 0 499 684 | | 8/1992 |
| EP | 0 913 099 | | 5/1999 |
| EP | 0 935 927 | | 8/1999 |
| EP | 1 228 700 | | 8/2002 |
| GB | 1 506 166 | | 4/1978 |
| WO | WO 02/49461 | * | 6/2002 |
| WO | WO 02/060277 | * | 8/2002 |

OTHER PUBLICATIONS

Hedley, C.L., et al., "*Developing novel pea starches*", Proceedings of the Symposium of the Industrial Biochemistry and Biotechnology Group of the Biochemical Society, 1996, pp. 77-87.

Hoover, R., et al., "*Composition, structure, functionality, and chemical modification of legume starches: a review*", Can. J. Physiol. Pharmacol., vol. 69, 1991, pp. 79-92.

E. Gruber: Unterlagen zur Vorlesung makromolekulare Chemie . . . WS 1999/2000 Haase et al.: Anm z. Qualität d. Erbsenstärke, starch/stärke 41, 1989, S. 49-54.

Sorting pisum names—Internet-Auszug Römpp: Stichwort Hülsenfrüchte.

\* cited by examiner

*Primary Examiner* — D. Lawrence Tarazano
*Assistant Examiner* — Hamid R Badr
(74) *Attorney, Agent, or Firm* — Young & Thompson

(57) ABSTRACT

A process for coating food products, characterized in that the products are coated before they are cooked with an aqueous coating composition including a modified legume starch having an amylose content of less than 40%.

7 Claims, No Drawings

PROCESS FOR COATING FOOD PRODUCTS

BACKGROUND

The present invention relates to a process for coating foods intended to be cooked. More precisely, the present invention relates to a process for coating before cooking vegetables, meat products or doughs for pizzas, donuts or tart bases, snacks, croquettes, cereals or breading agents, using a particular starch.

Fried vegetables and in particular fried potatoes are generally highly appreciated by consumers. These products are manufactured according to strict specifications relating to the raw material used and the manufacturing conditions. The consumer desires a crisp and golden product. Now, it is difficult, especially in the fast-food industry, to keep French fries crisp after cooking even if they are stored in heat. During cooking, the periphery of the product loses water and becomes hard and crisp. After cooking, the water present at the centre of the product moistens the periphery of the product again and the French fries lose their crispness.

It is known, in particular for French fries intended for deep-freezing, to coat these French fries with solutions containing high-molecular weight polysaccharides in order to improve their appearance and their crispness after cooking.

The development of coating products for French fries is in progress. These "coatings" are designed to improve the preservation and the crispness of the French fries after they have been cooked.

Patent EP 499,684 B1 describes a process for preparing frozen French fries, in which the French fries are coated before frying with a composition comprising a chemically modified and ungelatinized potato starch, an ungelatinized, chemically modified maize starch, and a rice flour. The combination of these three starches makes it possible to obtain crisp French fries, the taste of the coating is not detected by the consumer, and the rice flour makes it possible to maintain the tenderness of the product.

Patent EP 935,927 B1 describes a process for manufacturing dried potato pieces which are coated before cooking with a coating composition comprising a native and/or pregelatinized starch. The use of native starch is preferred because of the stability which it confers on the product with respect to rehydration. It is moreover established that good coatings are obtained from poorly cooked starches, that is to say having starch granules which have not burst open.

Moreover, it is known to use so-called "amylose-rich" starches, that is to say comprising at least 50% of amylose to coat products to be fried.

These starches have good film-forming properties and are reputed to be difficult to cook.

The coating film obtained constitutes an effective barrier to water. It is sought in general to use in the coating a polysaccharide having a high glass transition temperature, so that the coating film remains in a solid form for as long as possible.

Patent EP 913,099 describes a process for coating products for cooking, in particular potato crisps, intended to limit the water uptake of the coated products, using at least two starches of different sources, in particular the potato starch (PERFECTAMYL® FFC) and the yellow pea starch (NASTAR®), and a pea fibre. The coating also comprises a rice or wheat flour so as to preserve a satisfactory crispness.

There are several starches which have been developed to this effect, such as in particular Crispy Clear Coating System developed by the company AVEBE, based on modified potato starch. Its film-forming and crisp properties have been enhanced. Designed to retain the crispness and the heat of French fries for more than ten minutes after they have been cooked, this starch is applied during the preparation of (deep-frozen) French fries starting with a batter consisting of a suspension of 30 to 40% of starch in water.

To improve the crispness of the French fries over time, it is moreover known to use native and modified rice starches.

Numerous other coating compositions are described, and always contain a plurality of more or less complex constituents. A native starch is thus often combined with a dextrin and a rice flour. Some recipes moreover use plant gums such as guar gums for example.

SUMMARY OF INVENTION

Seeking to further improve the state of the art, the applicant thus focused on finding a simple solution which makes it possible to coat several food products for cooking, and in particular vegetables for frying such as French fries.

And it is after numerous trials that the applicant found a simple solution which makes it possible to obtain products of completely satisfactory organoleptic quality, using a particular composition comprising a chemically modified legume starch and having an amylose content of less than 40%. As will be moreover demonstrated, the use of this composition gives superior products which are preferred to those of the prior art.

The subject of the invention is therefore a process for coating food products, characterized in that the said products are coated before they are cooked with an aqueous coating composition comprising a modified legume starch having an amylose content of less than 40%.

DETAILED DESCRIPTION OF THE INVENTION

The expression food products for the purposes of the present invention is understood to mean raw pieces of vegetables, meat, fish, fruit, intended to be cooked or precooked for example by frying or in an oven, and doughs for cooking such as pizza doughs, tart doughs. These food products may also consist of frozen precooked products, the additional cooking of which is carried out by the consumer. There may be mentioned, without limitation, frozen French fries and other vegetables, pieces of fish, meat and any other food requiring a barrier coating against water.

The expression "legume" for the purposes of the present invention is understood to mean any plant belonging to the Caesalpiniaceae, Mimosaceae or Papilionaceae families and in particular any plant belonging to the Papilionaceae family, for example pea, haricot bean, broad bean, field bean, lentil, lucerne, clover or lupin.

This definition includes in particular all the plants described in any of the tables contained in the article by R. HOOVER et al. entitled "Composition, structure, functionality and chemical modification of legume starches: a review".

Preferably, the legume is chosen from the group comprising pea, haricot bean, broad bean and field bean.

Advantageously, it is pea, the term "pea" being considered here in its broadest sense and including in particular:
 all the wild varieties of "smooth pea", and
 all the mutant varieties of "smooth pea" and of "wrinkled pea", regardless of the uses for which the said varieties are generally intended (human consumption, animal nutrition and/or other uses).

The said mutant varieties are in particular those called "r mutants", "rb mutants", "rug 3 mutants", "rug 4 mutants", "rug 5 mutants" and "lam mutants" as described in the article by C-L HEYDLEY et al. entitled "Developing novel pea starches" Proceedings of the Symposium of the Industrial Biochemistry and Biotechnology Group of the Biochemical Society, 1996, pp. 77-87.

According to another advantageous variant, the legume is a plant, for example a pea or field bean variety which gives seeds containing at least 25%, preferably at least 40% by weight of starch (dry/dry).

The expression "legume starch" is understood to mean any composition extracted, in any manner, from a legume and in particular from a Papilionaceae, and whose starch content is greater than 40%, preferably greater than 50% and still more preferably greater than 75%, these percentages being expressed as dry weight relative to the dry weight of the said composition.

Advantageously, this starch content is greater than 90% (dry/dry). It may in particular be greater than 95%, including greater than 98%.

The expression modified legume starch is understood to mean a starch which has undergone at least one modification treatment chosen from the group comprising chemical treatments, physical treatments and enzymatic treatments.

The chemical treatments comprise in particular all known operations of esterification, etherification, crosslinking or hydrolysis by the acid or oxidative routes. According to a preferred variant of the invention, a starch is used which is crosslinked, preferably with trimetaphosphate.

The legume starch according to the invention is preferably a starch derived from "smooth pea", having an amylose content of between 30 and 40%, preferably between 35 and 40%, these percentages being expressed as dry weight relative to the dry weight of starch contained in the said composition.

The crosslinking is performed according to any technique known to persons skilled in the art, so as to obtain a high level of crosslinking. Preferably, sodium trimetaphosphate will be used as crosslinking agent. As a guide, the limit will be a level of crosslinking expressed as fixed phosphorus of 0.4% maximum.

According to the invention, it is also possible to envisage modifying the crosslinked starch by acetylation or hydroxypropylation for example. In this case, the level of crosslinking is generally increased so as to maintain a sufficient viscosity of the coating composition.

According to the invention, the coating composition comprises pea starch as sole source of starch. It may also comprise various additives such as flavourings, spices, taste enhancers, leavening powder, colourings. It may also comprise maltodextrins, gums and other agents suitable for coating.

In order to prepare the coating composition, it is advisable to place crosslinked pea starch in solution in water so as to obtain a viscosity of between 500 and 1000 centipoises, this viscosity being given by a Brookfield measurement at 20° C. As a guide, the dry matter content of the coating composition is between 35 and 45%. Advantageously, the said composition comprises 90% of pea starch.

The additives necessary are then added to the said composition.

According to a preferred variant, the composition also comprises a dextrin. The expression dextrin is understood to mean the products obtained by dry roasting of starch in the presence of acid. Although any type of dextrin may be suitable in the process according to the invention, pea dextrins are particularly preferred and in particular pea having an amylose content of between 30 and 40%, preferably between 35 and 40%. The latter advantageously make it possible to obtain the same crispness as with a rice flour normally used.

As regards the proportions of dextrin in the coating composition, a starch/dextrin ratio of between 2/1 and 1/4 is preferred. The higher the proportion of dextrin in the composition, the less stable the coating layer will be to frying (tendency to burst). The lower the proportion of dextrin in the coating composition, the lesser the crispness of the fried product. It is therefore advantageous to maintain a sufficient proportion of dextrin in the coating composition, the ideal situation being a ratio of 1/1.

In order to coat the food products in accordance with the process of the present invention, the products are immersed in the coating composition at room temperature, and then the products thus coated are cooked.

The coating obtained is practically invisible on the finished product, it confers sufficient crispness even after 15 minutes of cooling, that is to say that it offers very good stability to water regain by the cooked product.

The invention will be understood more clearly on reading the following examples which are intended to be illustrative and nonlimiting.

Example 1

Preparation of Deep Frozen French Fries

Potatoes are washed, peeled and cut into strips for French fries.

These French fries are immersed in a coating bath whose composition is the following:

| | |
|---|---|
| starch: | 229.5 g |
| salt: | 15 g |
| leavening powder: | 5 g |
| xanthan gum: | 0.5 g | water: sufficient quantity to obtain a Brookfield viscosity of between 500 and 1000 cP at room temperature.

Various starches are compared:

Trial 1: potato starch which is highly crosslinked by phosphate bonds

Trial 2: wheat starch which is highly crosslinked by phosphate bonds

Trial 3: crosslinked pea starch

Trial 4: maize starch containing 70% amylose

Trial 5: highly crosslinked potato starch PERFECTAMYL® FFC (AVEBE)

The coating composition is prepared by mixing powders in water, in the bowl of a KENWOOD blender. The mixture is blended until a homogeneous solution is obtained.

The coated French fries are drained and separated from each other, and then dipped in a frying bath at 170-180° C. They are then drained, and then frozen at −18° C.

The frozen French fries are then cooked for 2 min 30 sec within a deep fryer at 180° C., and then placed in an oven at 60° C. for 15 minutes.

Tasting is then performed every 5 minutes for 15 minutes.

The French fries are evaluated on the following parameters:

crispness and hardness, determined by a taste panel visual appearance of the coating The French fries of each trial are classified in order of preference:

3>2>1 (too hard)>4 (presence of crystals)>5 (not very crisp)

As regards the homogeneity of the coating, trials 2 and 3 are the most satisfactory.

A coating formula is then prepared comprising 153 grams of starch and 76.5 grams of dextrin (that is a 2/1 ratio). The remainder of the constituents are identical.

The formulas comprise:

A: crosslinked pea starch+pea dextrin

B: potato starch+potato dextrin

The French fries are tasted and compared with each other by the same taste panel.

The crosslinked pea starch in combination with the pea dextrin gives results which are superior to those obtained with the pea starch alone or the potato starch alone, and better than the potato starch/potato dextrin combination.

In trial A, the pea dextrin is then replaced with a rice flour, which is commonly used in the prior art to confer crispness on French fries.

The results obtained are identical, which makes it possible to conclude on the possible replacement of rice flour with a dextrin.

Conclusion: The formulas based on crosslinked pea starch meet the required criteria: crispness of the French fries up to 15 minutes after cooking and a coating which is not very visible. The results are even better when a portion of the starch is replaced with a wheat, potato or preferably pea dextrin. Very good results have been obtained with a starch/dextrin weight ratio of 1/1.

The invention claimed is:

1. A process for coating food products, said process comprising coating said products before they are cooked with an aqueous coating composition comprising a crosslinked legume starch having an amylose content of 30% to 40% expressed as dry weight relative to the dry weight of starch contained in the said composition, wherein the legume starch has not undergone a modification treatment selected from the group consisting of physical treatments, enzymatic treatments, chemical treatment by esterification, chemical treatment by etherification, and chemical treatment by hydrolysis by acid or oxidative routes, wherein said composition comprises pea starch as sole source of starch.

2. The process according to claim 1, wherein said pea starch is from smooth pea having an amylose content of between 35 and 40% expressed as dry weight relative to the dry weight of starch contained in the said composition.

3. A process for coating food products, comprising:
   coating said products before they are cooked with an aqueous coating composition comprising starch,
   wherein the starch consists of crosslinked smooth pea starch.

4. The process according to claim 1, wherein said composition additionally comprises a dextrin.

5. The process according to claim 4, wherein said dextrin is a pea dextrin.

6. The process according to claim 4, wherein said composition has a starch/dextrin weight ratio between 2/1 and 1/4.

7. The process according to claim 1, wherein said composition has a Brookfield viscosity of between 500 and 1000 centipoises at 20° C.

* * * * *